F. COBEY.
CHUCK.
APPLICATION FILED MAR. 29, 1917.
1,304,658. Patented May 27, 1919.
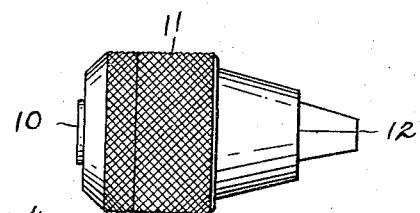
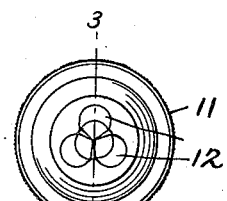
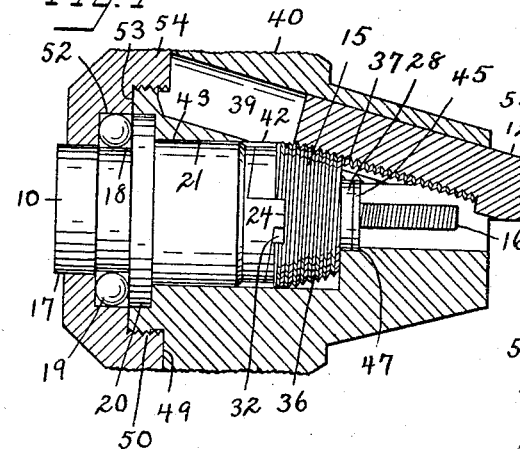
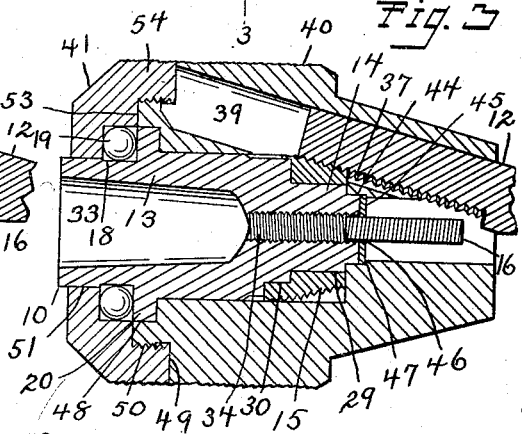
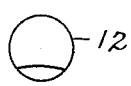
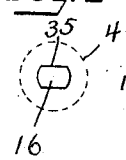
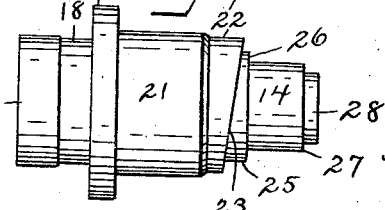
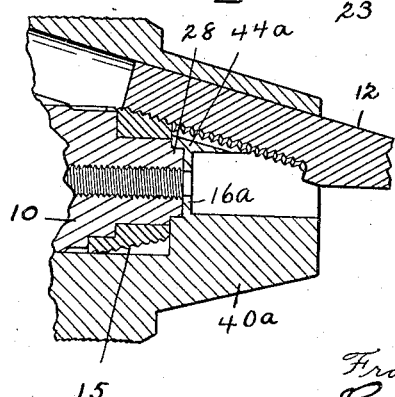
Inventor:
Frank Cobey.
Louis M. Schmidt
Atty

UNITED STATES PATENT OFFICE.

FRANK COBEY, OF EAST BERLIN, CONNECTICUT.

CHUCK.

1,304,658. Specification of Letters Patent. Patented May 27, 1919.

Application filed March 29, 1917. Serial No. 158,285.

*To all whom it may concern:*

Be it known that I, FRANK COBEY, a citizen of the United States, residing at East Berlin, in the county of Hartford and State of Connecticut, have invented certain new and useful Improvements in Chucks, of which the following is a specification.

My invention relates to improvements in chucks, and the object of my improvement is simplicity and economy in construction and convenience and efficiency in use, and as pertains to the feature of the backing or thrust screw shown and to be described is related to my other applications, Serial No. 28,170, filed May 14, 1915, and Serial No. 158,286, filed March 29, 1917.

In the accompanying drawing:—

Figure 1 is a side elevation of my improved chuck.

Fig. 2 is an end elevation of the same.

Fig. 3 is a sectional view on an enlarged scale on the line 3—3 of Fig. 2.

Fig. 4 is a similar view with certain parts shown in side elevation.

Fig. 5 is an end elevation of one of the jaws.

Fig. 6 is an end elevation of the thrust screw.

Fig. 7 is a side elevation of the main part of the spindle member.

Fig. 8 is a side elevation of the moving part of the spindle member.

Fig. 9 is a fragmentary sectional view of certain parts shown in Fig. 3.

My improved chuck comprises a spindle member 10, a shell member 11 rotatively mounted thereon, and a set of jaws 12 operatively engaged with the said members.

The spindle member 10 is composed of a body 13 having a reduced extension 14 at the outer end and a moving jaw engaging member 15 mounted on the said extension, and is provided with an axially positioned thrust screw 16 threaded into the said extension 14.

Considering the spindle member 10 in further detail, the body 13 thereof comprises exteriorly a cylindrical portion 17 at the inner end, a reduced ball race 18 for a set of balls 19 at the outer end of the said cylindrical portion 17, and an annular flange 20 at the outer end of the said ball race 18. Outwardly from the flange 20 and extending for an appreciable length is a second cylindrical portion 21 that merges at the outer end into a slightly reduced end cam member 22 that has the end face 23 formed as an end cam. The said end cam face 23 is of helical form and is provided at one end with a longitudinally projecting lug 24. Extending outwardly for a short distance from the inner edge of the end cam face 23 is a cylindrical portion 25 that terminates in a step or shoulder 26, positioned at the inner end of the reduced extension 14 already mentioned. The said extension 14 has a cylindrical periphery and at the outer end is stepped as shown at 27 at the junction of the said outer end with a short end extension 28.

The moving or jaw engaging member 15 is of annular form, having a bore composed of a main portion 29 that is a fit for the reduced extension 14, and an inner end portion 30 to fit the cylindrical portion 25 of the body 13, has the inner end face 31 formed as an end cam to coöperate with the end cam 23, and has a portion of the said end face 31 recessed as shown at 32 to receive the end lug 24 and to limit the lateral or rotative movement thereof.

The periphery 36 of the moving member 15 is of conical form and is threaded to fit the threads 37 on the inner, opposed faces of the jaws 12.

The spindle member 10 is provided interiorly with a bore composed of an inner tapered portion 33 for receiving the correspondingly tapered end of the spindle and an outer threaded portion 34, of relatively small diameter to fit and to receive the thrust screw 16.

The thrust screw 16 is headless, and has the outer end portion made non-circular in some suitable manner. As shown, the said thrust screw 16 has opposite sides 35 flattened.

The jaws 12 are three in number, are of cylindrical form, fitting in longitudinal, converging ways 39 in the shell member 11, and on the faces opposed to the moving member 15 are provided with the screw thread 37 already mentioned.

The shell member 11 is composed of two parts, comprising the main or jaw engaging part 40 at the outer end and the retaining part 41 at the inner end. The main part 40 incloses the outer end portion of the spindle member 10, is provided with the jaw ways 39, and extends inwardly as far as the rear face of the annular flange 20, and has the bore 42 formed so as to provide clearance for the intermediate portion of the spindle member 10 composed of the moving member 15 and the adjacent end cam member 22 of the body 13, and also to provide a positive bearing engagement with the said body 13 on each side of the said intermediate portion, comprising a cylindrical bearing surface 43 adjacent the inner end, engaged with the cylindrical portion 21, and adjacent the outer end comprising the cylindrical portion 44 engaged with the periphery of the end extension 28.

Outwardly from the end extension 28 there is a washer 45 having a non-circular hole 46 to fit the end thrust screw 16, the said washer being forced into and filling an extension of the bore 44 and bearing against a shoulder 47, the said washer 45 being a tight fit for the inclosing bore and forced into place. At the inner end of the main part 40 there is an enlargement 48 of the bore to fit over the flange 20.

Exteriorly the main part 40 has the usual tapered form for the outer end to correspond to the inclination of the jaws 12, and a cylindrical form for the adjacent body portion, and at the inner end is reduced to form the shoulder 49 and the inwardly directed and exteriorly threaded neck 50 that terminates as mentioned flush with the rear face of the flange 20.

The inner, retaining part 41 forms a closure for the inner end portion of the shell member and has a bore comprising at the inner end the end portion 51 fitting over the cylindrical bearing portion 17 of the spindle member 10, the enlarged portion 52 that completes the raceway 18 for the balls 19, and the said bore is still further enlarged at the outer end of the said raceway to provide the shoulder 53 to abut against the end of the reduced neck 50 and the exteriorly overhanging extension 54 that abuts against the shoulder 49 and is interiorly threaded to engage with the threaded neck 50.

As described, the shell member is composed of two parts only and one of the said parts has positive bearing engagement with the body of the spindle member on each side of the moving and operating parts of the said spindle member, designated as the intermediate portion.

The provision of the washer 45 as a separate piece for engaging with the thrust screw 16 is a constructive feature and in lieu thereof I may provide an integral structure, such as shown in Fig. 9, in which a bridge 16$^a$ is provided at the end of the portion 44$^a$ of the bore in the main part 40$^a$ that engages with the end extension 28.

As the shell member is rotated relatively to the spindle member the jaws are moved to and fro to correspond to the relative direction of rotation and the thrust screw is also rotated and moved correspondingly to and fro, the thrust screw being moved outwardly as the jaws are moved outwardly to bring the ends of the jaws together.

The screw threads on the moving member and on the jaws serve for ordinary tightening the jaws and the helical end cam members serve to effect a quick release of the jaws.

I claim as my invention:—

1. In a chuck comprising a spindle member, a shell member, and a set of jaws, the said spindle member having an annular shoulder serving as a thrust bearing, the said shell member being composed of two parts that are joined together adjacent the said shoulder by two coöperating threaded portions, and the said parts having coöperating, abutting shoulders, one on each side of the said threaded portions.

2. A chuck comprising a spindle member and a shell member rotatively mounted thereon, an axially positioned thrust screw extending outwardly from the said spindle member and having the outer portion of non-circular form, and the said shell member being provided with a division wall that has a hole fitting the said outer portion of the thrust screw.

3. A chuck comprising a spindle member and a shell member rotatively mounted thereon, an axially positioned thrust screw extending outwardly from the said spindle member and having the outer portion of non-circular form, the said shell member being provided with a division wall that has a hole fitting the said outer portion of the thrust screw, and the said division wall being in the form of a separate piece secured in the said shell member.

FRANK COBEY.

Witnesses:
W. E. LATHAM,
ALFRED L. THOMPSON.

Copies of this patent may be obtained for five cents each, by addressing the "Commissioner of Patents Washington, D. C."